United States Patent
Borø et al.

(10) Patent No.: US 12,180,928 B2
(45) Date of Patent: Dec. 31, 2024

(54) FLOATING FOUNDATION FOR AN OFFSHORE WIND TURBINE, A SYSTEM FOR EXTRACTING ENERGY FROM WIND, AND A METHOD OF INSTALLING A WIND TURBINE

(71) Applicant: Newtech AS, Søgne (NO)

(72) Inventors: Yngvar Borø, Søgne (NO); Ricardo Nuno Correia, Flekkerøy (NO); Arild Andersen, Kristiansand (NO)

(73) Assignee: Newtech AS, Søgne (NO)

( * ) Notice: Subject to any disclaimer, the term of this patent is extended or adjusted under 35 U.S.C. 154(b) by 364 days.

(21) Appl. No.: 17/621,853

(22) PCT Filed: Jun. 26, 2020

(86) PCT No.: PCT/NO2020/050184
§ 371 (c)(1),
(2) Date: Dec. 22, 2021

(87) PCT Pub. No.: WO2021/002760
PCT Pub. Date: Jan. 7, 2021

(65) Prior Publication Data
US 2022/0235740 A1    Jul. 28, 2022

(30) Foreign Application Priority Data
Jul. 4, 2019  (NO) .................................. 20190847

(51) Int. Cl.
*F03D 13/25*  (2016.01)
*B63B 35/44*  (2006.01)
(Continued)

(52) U.S. Cl.
CPC .............. *F03D 13/25* (2016.05); *B63B 35/44* (2013.01); *F03D 13/10* (2016.05); *F03D 13/22* (2016.05);
(Continued)

(58) Field of Classification Search
CPC .......... F03D 13/00; F03D 13/10; F03D 13/22; F03D 13/25; B63B 35/00; B63B 35/44;
(Continued)

(56) References Cited

U.S. PATENT DOCUMENTS 9,574,550 B2 *  2/2017  Fyfe ........................ F03D 13/25

FOREIGN PATENT DOCUMENTS

| DE | 102016012143 | 4/2018 |
| EP | 2643210 | 10/2013 |

(Continued)

OTHER PUBLICATIONS

Paulsen, O. S. Sizing of a spar-type floating support structure for DeepWind, Department of Wind Energy E Report 2014, Nov. 2013 [Downloaded Jan. 31, 2020].

(Continued)

*Primary Examiner* — Lars A Olson
(74) *Attorney, Agent, or Firm* — Andrus Intellectual Property Law, LLP

(57) ABSTRACT

A floating foundation for an offshore wind turbine has a center pipe, a buoyancy section, a weight section, and a plurality of wire ropes, The buoyancy section is connected to the center pipe to keep the foundation floating. The weight section is connected to the center pipe to provide stability to the foundation. The wire ropes are connected to the buoyancy section and the weight section and are arranged for being tensioned so as to add bending strength to the foundation The floating foundation has hoisting means for lowering or raising the center pipe. The hoisting means includes winches for increasing or decreasing a length of each of wire ropes connecting the buoyancy section and the weight section, for lowering or raising the center pipe of the floating foundation. A system is disclosed for extracting energy from wind. A method is disclosed for installing a wind turbine.

19 Claims, 4 Drawing Sheets

(51) Int. Cl.
*F03D 13/10* (2016.01)
*F03D 13/20* (2016.01)

(52) U.S. Cl.
CPC ..... *B63B 2035/446* (2013.01); *F05B 2240/93* (2013.01); *F05B 2240/95* (2013.01)

(58) Field of Classification Search
CPC ........... B63B 2035/446; F05B 2240/93; F05B 2240/95
USPC ........................................................ 114/264
See application file for complete search history.

(56) References Cited

FOREIGN PATENT DOCUMENTS

| | | |
|---|---|---|
| ES | 2444950 | 2/2014 |
| FR | 3036371 | 11/2016 |
| JP | 2015500929 | 1/2015 |
| KR | 101240722 | 3/2012 |
| WO | 2004061302 | 7/2004 |
| WO | 2011057940 | 5/2011 |
| WO | 2012030123 | 8/2012 |
| WO | 2013076351 | 5/2013 |
| WO | 2014062792 | 4/2014 |
| WO | 2016100828 | 6/2016 |

OTHER PUBLICATIONS

Norwegian Search Report for No. 20190847, dated Jan. 31, 2020.
International Search Report for PCT/NO2020/050184, dated Sep. 29, 2020.
Written Opinion of the International Search Report for PCT/NO2020/050184, dated Sep. 29, 2020.
Response to the Written Opinion for PCT/NO2020/050184, dated May 4, 2021.
Second Written Opinion of the International Search Report for PCT/NO2020/050184, dated Aug. 16, 2021.
International Preliminary Report on Patentability for PCT/NO2020/050184, dated Sep. 29, 2021.

\* cited by examiner

FLOATING FOUNDATION FOR AN OFFSHORE WIND TURBINE, A SYSTEM FOR EXTRACTING ENERGY FROM WIND, AND A METHOD OF INSTALLING A WIND TURBINE

CROSS-REFERENCE TO RELATED APPLICATIONS

This application is the U.S. national stage application of International Application PCT/NO2020/050184, filed Jun. 26, 2020, which international application was published on Jan. 7, 2021, as International Publication WO 2021/002760 in the English language. The International Application claims priority of Norwegian Patent Application No. 20190847, filed Jul. 4, 2019. The international application and Norwegian application are both incorporated herein by reference, in entirety.

FIELD

The present invention relates to the field of foundations for constructions, and in particular to the field of foundations for offshore wind turbines. It relates to a device, a system and a method for supporting a floating wind turbine.

BACKGROUND

There is an ongoing effort towards renewable energy. As part of this ongoing effort, considerable investments and technological advancements are being made in the technological area of offshore wind-energy extraction.

To harvest energy from wind offshore, it may be desirable to erect wind turbines on deep waters. For such a purpose, floating foundations may be highly desirable.

There exist already numerous examples of floating wind-turbine foundations. One example is known from WO 2004061302 A2, wherein a floating foundation for wind turbines is disclosed, where the foundation essentially comprises at least three submerged buoyancy bodies connected to the lower end of the wind turbine.

Hywind is another example of a floating foundation, which comprises a spar buoy as a base for a wind turbine. The Hywind spar buoy is heavy and inflexible, making installation challenging.

An object of the invention is to remedy or to reduce at least one drawback of prior art.

SUMMARY

According to a first aspect of the invention, there is provided a floating foundation for an offshore wind turbine, the floating foundation comprising a centre pipe, a buoyancy section, a weight section, and a plurality of wire ropes, wherein:
the buoyancy section is connected to the centre pipe for providing buoyancy to the foundation to keep the foundation floating;
the weight section is connected to a lower end portion of the centre pipe for providing stability to the foundation; and
the plurality of wire ropes extend between and are connected to the buoyancy section and the weight section and are arranged for being tensioned and for adding bending strength to the foundation when they are tensioned, wherein the floating foundation further comprises a plurality of hoisting means for lowering or raising the centre pipe of the floating foundation, and wherein the plurality of hoisting means is a plurality of winches for letting out or pulling in wire rope for increasing or decreasing a length of wire rope of each of the plurality of wire ropes connecting the buoyancy section and the weight section, for lowering or raising the centre pipe of the floating foundation.

The wire ropes may be tensioned wire ropes.

The buoyancy section may be fixed to the centre pipe. The buoyancy section may be fixed to an upper end portion of the centre pipe. The buoyancy section may be movably connected to the centre pipe in a manner that may allow movement of the centre pipe relative to the buoyancy section. The buoyancy section may be lockable to the centre pipe to prevent movement of the centre pipe relative to the centre pipe. The buoyancy section may be releasably lockable to the centre pipe.

The lower end portion of the centre pipe may be an opposite portion of the centre pipe relative to the upper end portion of the centre pipe. The weight section may be fixed to the lower end portion of the centre pipe.

The wire ropes may be fibre ropes, steel wire ropes, chains, hybrid ropes such as ropes comprising a mixture of steel and fibre, or other types of ropes suitable for the purpose. Adding bending strength through the use of said plurality of tensioned wire ropes, allows for a relatively lightweight design having the sufficient structural strength, and in particular the sufficient support against bending forces, for supporting a wind turbine.

At least one or more of the plurality of wire ropes may extend from an outer portion of the buoyancy section to a portion of the weight section. All of the plurality of wire ropes may extend from an outer portion of the buoyancy section to the weight section. The one or more or all of the wire ropes may extend to e.g. an upper, lower, outer, middle and/or inner part of the weight section.

The wire ropes may be connected to the buoyancy section and the weight section by use of means and methods known to a skilled person, such as by use of typical wire sockets or any other type of connection device suitable for the purpose. The wires may be connected to the weight section by use of means that may be operated by an ROV, e.g. by use of a fork mounting or any other type of connection equipment, appliance or gadget suitable for the purpose.

The centre pipe may be open in its lower end portion, to allow water into the centre pipe. A pipe being closed in the bottom will have to resist water pressure, and water pressure may add upwards force on the pipe from the bottom of the pipe which may not be desired. For purposes related to stability of the foundation, it may be advantageous to avoid adding buoyancy to the centre pipe from the bottom portion of the pipe. Having the centre pipe open in its lower end portion may advantageously allow for an at least partially hollow centre pipe, which may allow for a more lightweight foundation than would be needed had the end portion been closed.

The buoyancy section may be a section having a relatively low specific gravity, which may be significantly lower than the specific gravity of water, thus providing buoyancy to the foundation and keeping the foundation afloat. The buoyancy section may have a density that is e.g. 0.9 times the density of water, 0.8 times the density of water, 0.7 times the density of water or 0.5 times the density of water. The buoyancy added to the foundation from the buoyancy section, through a combination of the size and specific gravity of the buoyancy section, should be sufficient to ensure that the foundation may float even while carrying a wind turbine onto the foundation. Note that other parts than the buoyancy may add buoyancy to keep the foundation afloat.

The buoyancy section may comprise a ring being concentric with the centre pipe. The ring may be made from or comprise pressurised composite and/or steel or another suitable type of metal, or a pressurized RIB material. The buoyancy section may be e.g. substantially toroid-shaped, conically shaped, cylinder-shaped or torus-shaped, or have any other shape suitable for the purpose. The buoyancy section may be centred around the centre pipe. The buoyancy section may have a centre hole that may have a substantially circular shape to allow for the centre pipe to extend through the hole. The centre hole may have another shape than a circular shape.

The weight section may be a section having a relatively high specific gravity, which may be significantly higher than that of water. The weight section may have a density that is twice the density of water, four times the density of water or 10 times the density of water. The weight section may be relatively small in area and volume but may still be of considerable mass. The weight section may have a significantly smaller diameter than the buoyancy section. The weight section may improve the stability of the foundation when placed in a body of water through the force of gravity pulling on the weight section and thus pulling the lower end portion of the centre pipe downwards.

The weight section may comprise a plurality of prefabricated elements that may be connected to the lower portion of the centre pipe upon installation e.g. at sea or at a port. The weight section may comprise one or more tanks that may be filled by material of high specific gravity, such as e.g. iron ore or heavy concrete.

The foundation may comprise a platform. The platform may be an access platform and/or a working deck. The platform may be connected to the foundation. The buoyancy section may comprise the platform.

The hoisting means may be usable to alter the distance of the weight section from the buoyancy section and thus raising or lowering the centre pipe. The hoisting means/winches may typically be placed on the buoyancy section and may typically be arranged for pulling in or letting out the wire ropes connecting the buoyancy section to the weight section. This may be advantageous, e.g. for assembly of the foundation, for launching the foundation in a dock where the water depth is insufficient for a fully lowered centre pipe, for installation of a wind turbine on the foundation, for maintenance of the wind turbine, and more. The foundation may further comprise a locking mechanism for releasably and selectively locking the centre pipe in a position, e.g. in a position relative to the buoyancy section. The hoisting means may be referred to as a hoisting device.

By using the hoisting means to change the distance between the buoyancy section and the weight section, it is possible to alter the centre of gravity of the foundation. This may be of advantage for many different reasons, including for transportation and/or for launching of the foundation, for installation of a wind turbine, and/or for maintenance of the foundation or a wind turbine installed on the foundation.

One or more hoisting means may be arranged for and/or suitable for tensioning of one or more of the wire ropes.

One or more hoisting means may be arranged for pulling in or releasing one or more anchor wire ropes.

The foundation may comprise one or more actuators that may be arranged in connection with one or more wires for pulling in or letting out one the one or more wires. The one or more hoisting means may comprise the one or more actuators. The actuators may be arranged to adjust a length of released wire rope upon receiving a signal from a controller or a control device. The controller may be an operator remotely connected to the actuator. The foundation may comprise a communication device for remote connection to an operator for remote communication with the operator. The operator may be a manual operator and/or a computer device or operating system arranged to communicate with the communication device.

The foundation may comprise a control device that may be arranged to adjust e.g. a setting, state, position, of the foundation or a part of the foundation. The control device may e.g. be arranged to adjust a depth of the weight section in a body of water, an activation or deactivation of a hoisting means, a release or tensioning of a wire rope, or any other equipment of the foundation that may be operable by use of one or more electrical signals. The control device may be arranged in connection with the communication device.

The foundation may comprise one or more sensors, e.g. to obtain information on wind speed, wind direction, wave height, air or water temperature, orientation of the foundation, position of the weight section, etc. The control device may comprise or be connected to the one or more sensors. The control device may be arranged to receive information from the one or more sensors, and/or to act on information from the one or more sensors, e.g. by operating equipment, such as an actuator, in response to information from one or more sensors.

The weight section may be movably connected to the centre pipe. It may be movable horizontally and/or vertically. The weight section may be moved e.g. by use of the hoisting means. Moving the weight section may adjust a force component applied to the centre pipe from the weight section, which may in turn adjust an effect on stabilisation of the foundation by the weight section. Adjusting the force component by movement of the weight section relative to the centre pipe may e.g. be useful for improving stability of the foundation e.g. against a force acting on the foundation or a wind turbine on the foundation from e.g. wind or waves.

The control device may be arranged to move the weight section relative to the centre pipe and/or relative to the buoyancy section, e.g. automatically as a response to information gathered by the one or more sensors or as a response to operation by a local or a remote operator.

The control device may comprise instrumentation that is commonly used in heave compensation systems, such as a so-called MRU—a motion reference unit. The MRU may comprise one or more of the one or more sensors.

The control device may further comprise a computer device, a central processing unit (CPU), other computer-related hardware, software, including code and/or one or more algorithms, for reading, handling, storing, analysing and/or responding to information from the MRU and/or one or more sensors and/or communication received from an operator. The control device may be a part of an active heave compensation system (AHC) or comprise an AHC.

The AHC may include e.g. one or more wires, one or more hoisting means, one or more actuators, one or more computer devices, one or more sensors and/or one or more pieces of software. The AHC may be arranged to shift a position of e.g. the weight section, the centre pipe, a wind turbine placed on the foundation, in response to e.g. a condition of wind, waves and/or water current in a body of water.

The foundation may further comprise a locking device for releasably and selectively locking the weight section to the centre pipe.

Furthermore, the buoyancy section and/or the weight section and/or the tower may comprise one or more guiding devices and/or a cushion devices to reduce the risk or severity of damage caused to the tower and/or the buoyancy section and/or the weight section when the tower is moved relative to the buoyancy section or the weight section, and/or to facilitate ease of movement.

In a second aspect of the invention, there is provided a system comprising the foundation according to the first aspect of the invention, wherein the system further comprises a wind turbine for extracting energy from the wind standing on the foundation.

The system may further comprise means for anchoring the foundation to a seabed. The means for anchoring the foundation to the seabed may comprise one or more anchors and one or more anchor wire ropes, such as fibres, wires or chains or a combination of different types of anchor wire ropes, connecting the foundation to the anchors. The one or more anchors may be connected to the weight section, the buoyancy section and/or to the centre pipe of the foundation by use of one or more wire ropes. A means for anchoring the foundation may be referred to as an anchoring device.

A top end of the centre pipe or a separate tubular member extending from the centre pipe may extend above the buoyancy section and be used to connect a mast of the wind turbine to the foundation. The mast may be connected by use of any means/device and/or method known to a skilled person.

In a third aspect of the invention, there is provided a method of installing a wind turbine. The method may comprise the following steps:
  providing the foundation according to the first aspect of the invention;
  installing a mast of the wind turbine onto the foundation, and connecting the mast to the centre pipe;
  installing a nacelle on a upper portion of the mast; and
  mounting a plurality of rotor blades onto the nacelle.

In embodiments where the foundation comprises hoisting means for raising and lowering the centre pipe, the method may further comprise the steps of:
  lowering the centre pipe and as a result also the mast prior to installing the mast, the nacelle and the plurality of rotor blasts;
  raising the centre pipe after installing the mast, the nacelle and the plurality of rotor blasts, and thereby raising the wind turbine.

There is also described a method of performing maintenance on a wind turbine, the method comprising the steps of:
  lowering the centre pipe and as a result also the wind turbine;
  performing maintenance on the wind turbine;
  raising the centre pipe and thereby raising the wind turbine.

The lowering and raising of the centre pipe may be performed by use of the hoisting means. The lowering and raising may be performed by increasing and decreasing, respectively, a length of wire rope released from each of a plurality of winches, to increase the distance between the buoyancy section and the weight section.

There is further described a method of launching a floating foundation for a wind turbine, wherein the method comprises the steps of:
  providing the foundation according to the first aspect of the invention, the foundation comprising the hoisting means;
  keeping the weight section in a raised position; and
  launching the foundation into a sea.

There is further described a method of transporting a floating foundation for a wind turbine, wherein the method comprises the steps of:
  providing the foundation according to the first aspect of the invention, the foundation comprising the hoisting means;
  keeping the weight section in a raised position; and
  transporting the foundation.

The transporting of the foundation may be transporting at sea, on land or in the air. The raised position is a position where the weight section is closer to the buoyancy section than it will typically be in when installed at sea, prior to or subsequently to instalment of a wind turbine.

The foundation may use the hoisting means to raise the weight section to its raised position by raising the centre pipe. The hoisting means may subsequently be used to lower the weight section to an operational position by lowering the centre pipe.

It may be advantageous to keep the weight section closer to the buoyancy section for reasons related to e.g. balance and/or stability during transport, and/or to enable launching of the foundation into a sea at a port where the depth of water is not sufficient to receive the foundation with the weight section in its operational position.

It may be advantageous to keep the wires tensioned/prestressed while raising or lowering the centre pipe, to avoid swinging motions and/or to keep the structure stable.

The foundation may include a jack for keeping the wires tensioned during raising or lowering of the centre pipe. The methods may include the step of using the jack to keep the wire ropes tensioned during raising or lowering of the centre pipe. The methods may include the step of tensioning the wires ropes. The step of tensioning the wire ropes may include utilising the hoisting means to tension the wire ropes.

The mast may comprise of a plurality of sections. The sections of the mast may be installed one after the other, with the bottom section typically being installed first and the top section being installed last. The nacelle may typically be installed onto the top section subsequently of installing the top section onto the other sections of the mast.

The centre pipe may be lowered and/or raised a plurality of times during the installation. The pipe may be held in/locked into a plurality of different positions. One such position may be a lowest possible position. Another position may be a highest possible position. Other positions may be intermediary positions, between the two extreme positions.

The installation procedure may be a highly advantageous installation procedure, as it may allow for installation of e.g. nacelle and blades at a lower height than that of a fully erect mast. As a result, the installation may be less demanding with regards to e.g. lifting equipment than it would be had it not been possible to lower the mast during the installation.

The tensioning of the wire ropes may add compression to the centre pipe, which may increase the bending strength and/or otherwise improve the stability of the foundation. The tensioned wire ropes may be prestressed. When the wire ropes are sufficiently tensioned, the weight section may be forced against the centre pipe by the wire ropes, and the centre pipe be forced against a locking mechanism. This may lead to a pre-tensioning of the centre pipe, the locking mechanism and/or the weight section that may be highly beneficial for the foundation's ability to withstand a bending load, and/or to for making ensuring stiffness and stability of the foundation.

There is described a method of providing stability for a foundation for an offshore wind turbine, wherein the method comprises the steps of:
provides a foundation having a weight section, a buoyancy section, a centre pipe, a locking mechanism, one or more hoisting means, and a plurality of wire ropes, wherein the weight section and the buoyancy section are connected to the centre pipe, wherein the locking mechanism locks the buoyancy section to the centre pipe, the wire ropes extends between and a connected to the weight section and the buoyancy section, and the plurality of wire ropes each are connected to at least one of the one or more hoisting means for the hoisting means to pull in or let out wire rope;
pre-tensioning the wire ropes by use of the hoisting means, to force the weight section against the centre pipe and to force the centre pipe against the locking mechanism, thereby compressing the centre pipe.

The method may advantageously provide the foundation with a great ability to withstand bending loads and stiffness, which may be advantageous for the stability of the foundation.

In a fourth aspect, there is provided a method of improving stability of a foundation for an offshore wind turbine, wherein the method comprises the steps of:
providing the foundation, wherein the foundation has a weight section, a platform for a wind turbine, and an active heave compensation system, the active heave compensation system comprising at least one wire rope, at least one sensor, at least one actuator, at least one hoisting means, and at least one control device, the active heave compensation system being arranged to alter a position of the weight section relative to the platform for the wind turbine, wherein the at least one hoisting means is connected to the at least one wire rope, and wherein the control device is connected to the at least one sensor for receiving data from the at least one sensor and connected to the at least one hoisting means to communicate a signal to operate the at least one hoisting means to let out or pull in wire rope;
altering the position of the weight section by altering the tension of the at least one wire rope connected to the weight section by pulling in or letting out a length of the at least one wire rope by use of the at least one hoisting means, wherein the altering of the position of the weight section is performed automatically as a result of the control device processing data obtained by the at least one sensor and as a response sends a signal to operate the at least one hoisting means.

The foundation may be an embodiment of the foundation according to the first aspect of the invention. The platform for the wind turbine may be e.g. an upper end of the centre pipe of the foundation. The altering of the position of the weight section may be an altering of the position relative to the centre pipe of the foundation. One of, a number greater than one of, or all of the wire ropes of the foundation may be part of the AHC system and be arranged for automatic altering of the position of the weight section in response to data obtained by the at least one sensor.

The active heave compensation system and the method may be applied to improve the stability of the foundation by actively holding the tower in a substantially vertical position, and/or e.g. reducing pitch and roll.

The centre pipe may have an uneven outer diameter but may advantageously have an even outer diameter along its length. The centre pipe may have an even inner diameter but may advantageously have an uneven inner diameter along its length. It may be advantageous for the centre pipe to have uneven thickness along its length. It may e.g. be advantageous for the centre pipe to be thicker in a vertical middle portion of the pipe than in e.g. a lowermost or uppermost portion. However, the centre pipe may be thicker in an uppermost or in a lowermost portion. The thickness may advantageously be greater in the middle portion e.g. for the centre pipe to withstand buckling.

The foundation according to the invention may typically have a centre pipe that is longer and reaching a greater depth of water than other foundations known from prior art, thus holding the weight section at a comparably greater depth. This allows for moving a gravity point downwards and providing the necessary stability to support a wind turbine in a more lightweight design than what is known from prior art.

Relevant prior art publications and their relevant content

BRIEF DESCRIPTION OF THE DRAWINGS

In the following is described examples of preferred embodiments illustrated in the accompanying drawings, wherein.

DETAILED DESCRIPTION OF THE DRAWINGS

Note that the embodiments shown in the figures are mere examples of the invention, and that they are not necessarily drawn to scale. Other embodiments being configured differently from those shown in the figures may be within the scope of the invention according to the claims.

Figure 1:
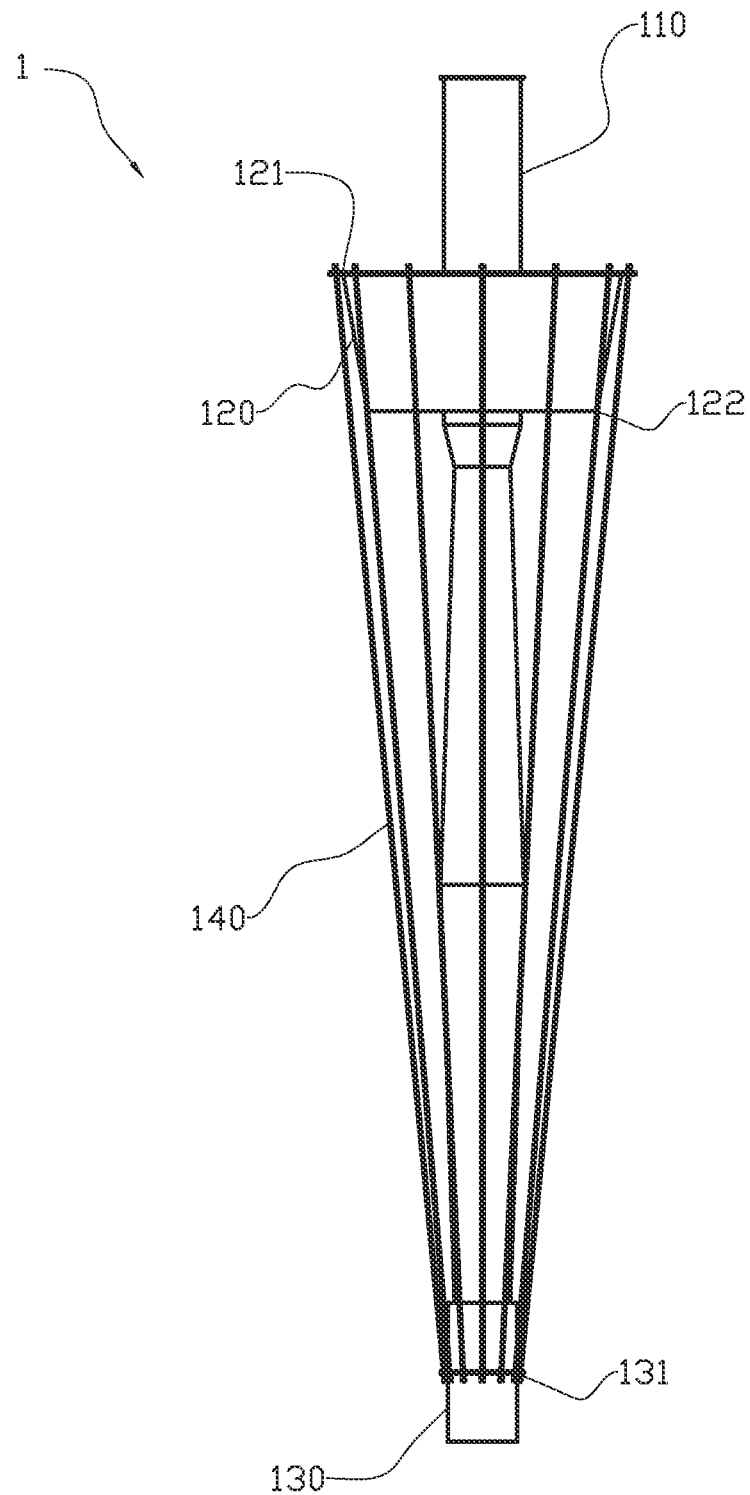
FIG. 1 shows a side-view of an embodiment of the foundation according to the first aspect of the invention.

FIG. 1 shows a foundation 1 according to the first aspect of the invention, having a centre pipe 110, a buoyancy section 120, a weight section 130 and a plurality of tensioned wire ropes 140 connecting the buoyancy section 120 to the weight section 130. The buoyancy section 120 and the weight section 130 are both concentric with the centre pipe 110.

The buoyancy section 120 has an upper portion 121 and a lower portion 122, wherein the diameter of the upper portion 121 is greater than that of the lower portion 122. The plurality of wire ropes 140 are fastened to the upper portion 121 of the buoyancy section 120 and extend from the upper portion 121 to a middle portion 131 of the weight section 130.

The buoyancy section 120 adds buoyancy to the foundation 1, enabling the foundation 1 to stay afloat while supporting a wind turbine (not shown). The weight section 130 adds weight to a bottom section of the centre pipe 110, thereby providing a centre of gravity that improves the stability of the foundation 1.

Should forces be affecting the foundation 1 in a manner that makes the foundation 1 tilt, the weight section 130 by help of gravity will provide stability by counteracting the tilt. A tilt will swing the bottom section of the centre pipe 110 upwards. The force of gravity, however, will act on the weight section 130, pulling it downwards, thereby counteracting the upwards movement, and thereby counteracting the tilt.

Furthermore, in the case of a tilting foundation 1, the forces to tilt the foundation are likely mainly forces acting on an above-water portion of the foundation 1, typically from a wind turbine installed on the foundation 1. The forces will make the foundation 1 tilt, and a force will then be transferred through the centre pipe 110 from the above-water portion of the foundation 1 and act on the weight section 130 to lift the weight section 130. The centre pipe 110 will act to lift the weight section 130, acting against the force of gravity pulling the weight section 130 downwards. This will cause a bending load on the centre pipe 110. The plurality of wire ropes 140 will provide structural strength to the foundation 1 and particularly bending strength for foundation 1 to withstand bending loads. By providing said plurality of wire ropes 140, some strain from bending loads will be moved from vulnerable portions of the centre pipe 110 to one or more of the plurality of wire ropes 140.

Figure 2:
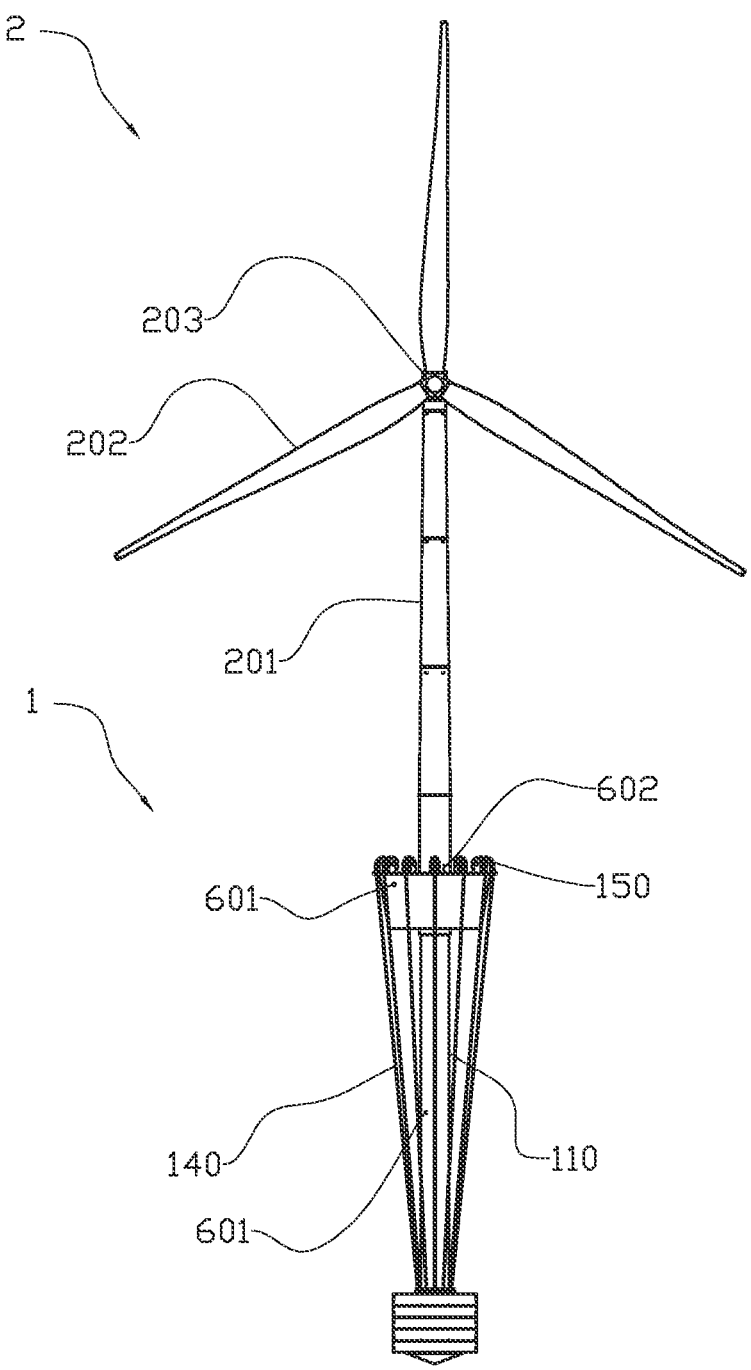
FIG. 2 shows a side-view of the system according to the second aspect of the invention.

FIG. 2 shows the foundation 1 supporting a wind turbine 2 including a mast 201 and three blades 202. The foundation 1 is relatively, compared to prior art, lightweight and compact, which is made possible by the inventive use of the plurality of wire ropes 140 that adds bending strength to the structure.

Figure 3:
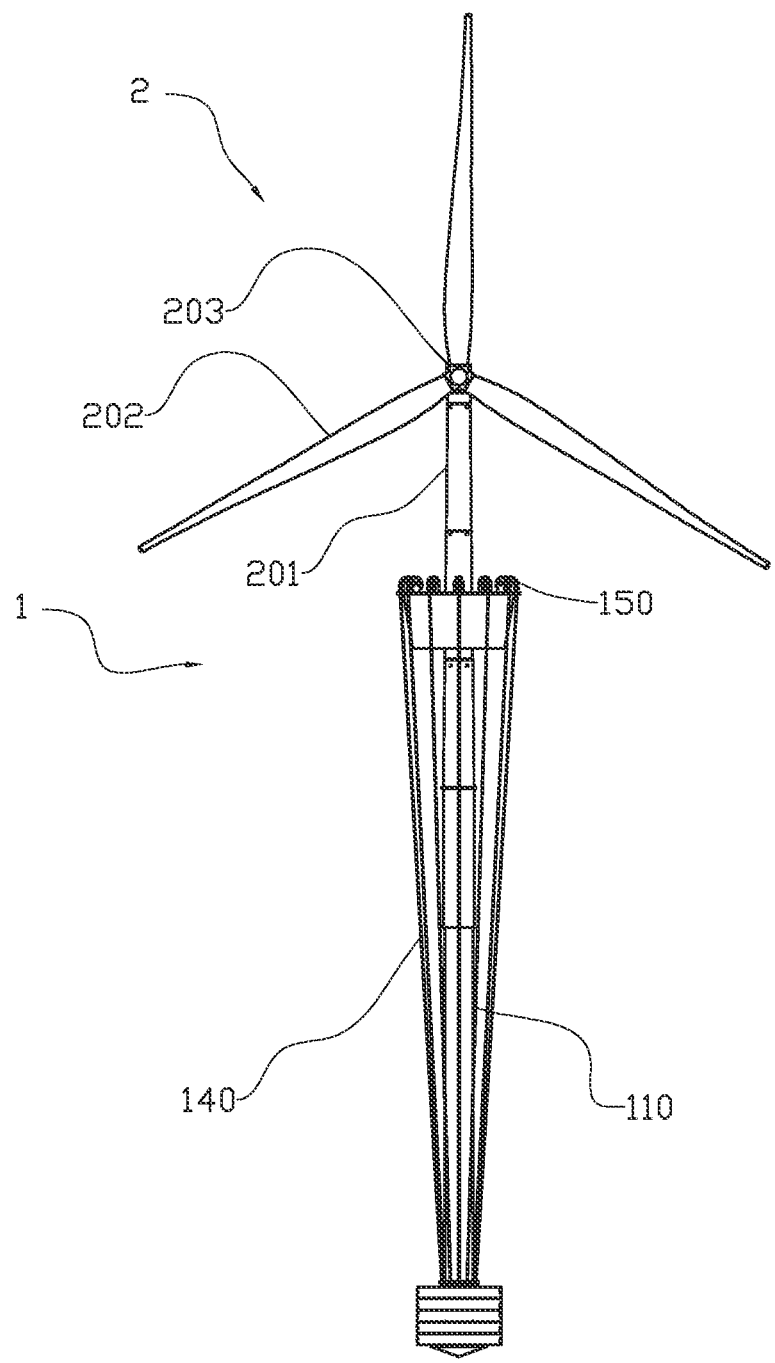
FIG. 3 shows a side-view of the system according to the second aspect of the invention, with the centre pipe lowered by use of hoisting means.

FIGS. 2 and 3 shows embodiments of the foundation 1 comprising a plurality of winches 150 for lowering and raising the centre pipe by letting out or pulling in a length of the plurality of wire ropes 140. The figures show a wind turbine 200 with a mast 201, a nacelle 203 and blades 202 mounted on the foundation 1. In FIG. 2, the wind turbine 200 is in a fully raised position. In FIG. 3, the winches 150 have let out a length of wire rope 140, such that the centre pipe 110 and the wind turbine 200 has been lowered.

Although the wire ropes 140 are shown in the figures extending inwards towards the centre pipe 110 from their connection to the buoyancy section 120 to their connection to the weight section 130, they may be connected in an inverse fashing; extending outwards towards the centre pipe 110 from their connection to the buoyancy section 120 to their connection to the weight section 130.

The embodiment in FIG. 2 further comprises an active heave compensation system comprising a control device 602 that is connected to two sensors 601 for gathering information on conditions relevant for the stability of the foundation 1. The control device 602 is further connected to the winches 150 for operating the winches in response to data gathered by the sensors 601, for letting our or pulling in a length of wire rope 140 of a wire operated by a winch 150.

Figure 4:
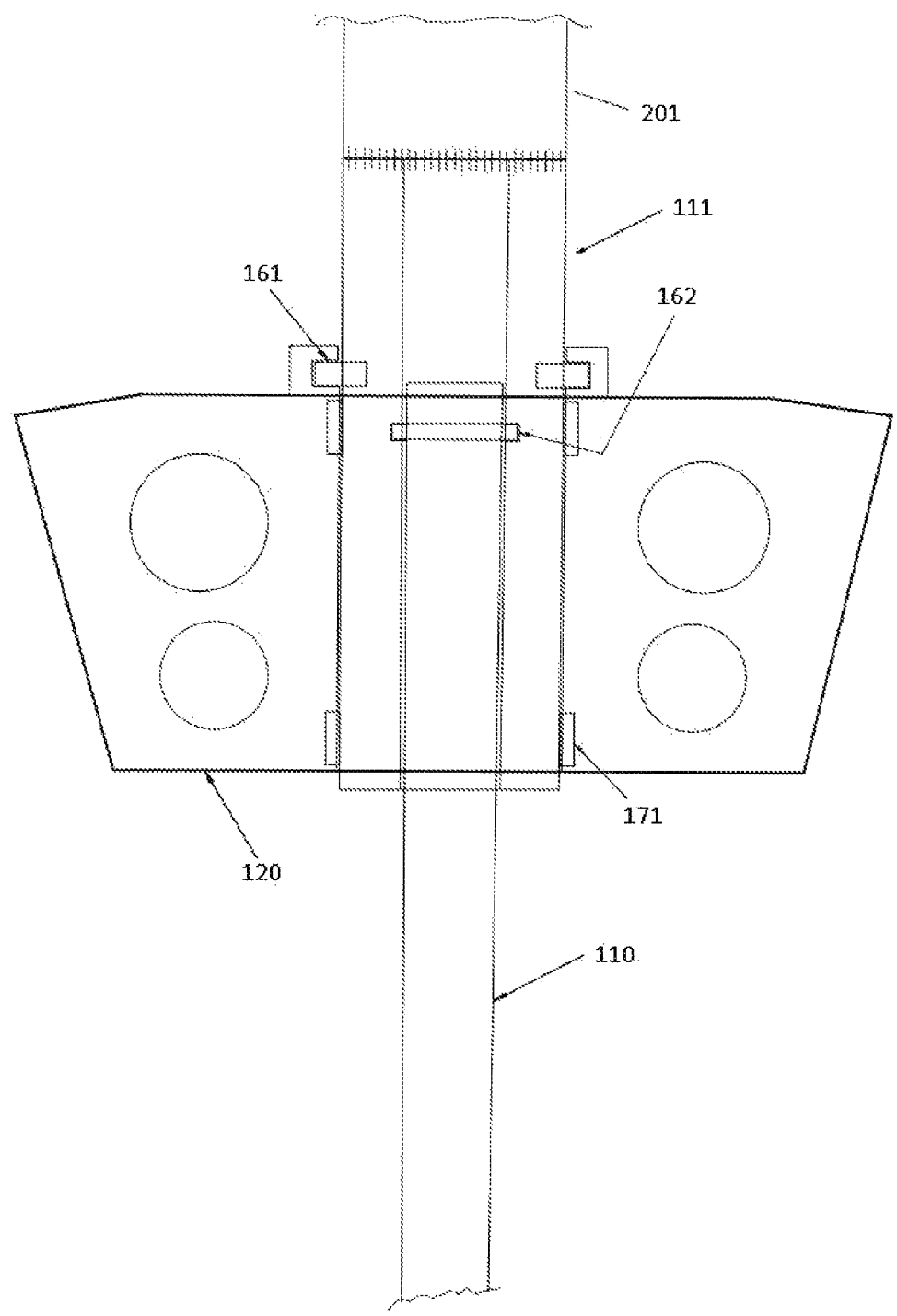
FIG. 4 shows a cross-sectional view of an upper part of an embodiment of the foundation.

FIG. 4 shows a cross-sectional view of an upper part of the foundation 1 according to the first aspect of the invention. The foundation 1 includes the centre pipe 110, which is coupled to a mast 201 via an intermediate tower section 111. Further, the figure shows the buoyancy section 120. The buoyancy section 120 is shown comprising a first locking mechanism 161 and a second locking mechanism 162, wherein the first locking mechanism 161 releasably locks the buoyancy section 120 to the intermediate tower section 111 and the second locking mechanism 162 releasably locks the buoyancy section 120 to the centre pipe 110.

Furthermore, the buoyancy section 120 comprises an upper an a lower guiding device 171 for allowing movement of the buoyancy section 120 relative to the centre pipe 110, the intermediate tower section 111 and/or the mast 201.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A floating foundation for an offshore wind turbine, the floating foundation comprising a center pipe, a buoyancy section, a weight section, and a plurality of wire ropes, wherein:
   the buoyancy section is connected to the center pipe for providing buoyancy to the floating foundation to keep the floating foundation floating;
   the weight section is connected to a lower end portion of the center pipe for providing stability to the floating foundation; and
   the plurality of wire ropes extend between and are connected to the buoyancy section and the weight section and are arranged for being tensioned and for adding bending strength to the floating foundation when they are tensioned,
   wherein the floating foundation further comprises a plurality of hoisting means for lowering or raising the center pipe of the floating foundation, and wherein the plurality of hoisting means is a plurality of winches for letting out or pulling in wire rope for increasing or decreasing a length of wire rope of each of the plurality of wire ropes connecting the buoyancy section and the weight section, for lowering or raising the center pipe of the floating foundation.

2. The floating foundation according to claim 1, wherein at least one or more of the plurality of tensioned wire ropes extend from an outer portion of the buoyancy section to the weight section.

3. The floating foundation according to claim 1, wherein the buoyancy section comprises a ring being concentric with the center pipe.

4. The floating foundation according to claim 1, wherein the center pipe is open in its lower end portion, so as to allow water into the center pipe.

5. The floating foundation according to claim 1, wherein the floating foundation comprises a selectively releasable locking mechanism for locking the center pipe in a position.

6. The floating foundation according to claim 1, wherein the floating foundation further comprises an active heave compensation system, the active heave compensation system comprising at least one sensor and being arranged to alter a position of the weight section relative to the center pipe in response to information obtained by the at least one sensor, the at least one sensor being arranged to obtain information relevant for the stability of the floating foundation in a body of water.

7. A floating foundation for an offshore wind turbine, the floating foundation comprising
   a center pipe,
   a buoyancy section,
   a weight section, and
   a plurality of tensioned wire ropes,
      wherein the buoyancy section is fixed to an upper end portion of the center pipe for providing buoyancy to the floating foundation to keep the floating foundation floating in a body of water, and the buoyancy section is configured to float at a surface of the body of water such that an above-water portion of the floating foundation is above the surface, the weight section is fixed to an opposite, lower end portion of the center pipe for providing stability to the floating foundation, and the plurality of tensioned wire ropes extends between and are connected to the buoyancy section and the weight section for adding bend portioning strength to the floating foundation.

8. The floating foundation according to claim 7, wherein at least one or more of the plurality of tensioned wire ropes extend from an outer portion of the buoyancy section to the weight section.

9. The floating foundation according to claim 7, wherein the buoyancy section comprises a ring being concentric with the center pipe.

10. A system for extracting energy from wind, the system comprising
   a wind turbine and
   a floating foundation comprising
      a center pipe,
      a buoyancy section,
      a weight section, and
      a plurality of tensioned wire ropes,
         wherein the buoyancy section is fixed to an upper end portion of the center pipe for providing buoyancy to the floating foundation to keep the floating foundation floating in a body of water, and the buoyancy section is configured to float at a surface of the body of water such that an above-water portion of the floating foundation is above the surface,
         the weight section is fixed to an opposite, lower end portion of the center pipe for providing stability to the floating foundation, and
         the plurality of tensioned wire ropes extends between and are connected to the buoyancy section and the weight section for adding bend portioning strength to the floating foundation.

11. A method of installing a wind turbine, the method comprising:
   providing a floating foundation comprising a center pipe, a buoyancy section, a weight section, and a plurality of tensioned wire ropes, wherein the buoyancy section is fixed to an upper end portion of the center pipe for providing buoyancy to the floating foundation to keep the floating foundation floating in a body of water, and the buoyancy section is configured to float at a surface of the body of water such that an above-water portion of the floating foundation is above the surface, the weight section is fixed to an opposite, lower end portion of the center pipe for providing stability to the floating foundation, and the plurality of tensioned wire ropes extends between and are connected to the buoyancy section and the weight section for adding bend portioning strength to the floating foundation;
   installing a mast onto the floating foundation, and connecting it to the center pipe;
   installing a nacelle on a upper portion of the mast; and
   mounting a plurality of rotor blades onto the nacelle.

12. The method according to claim 11, further comprising providing the floating foundation with hoisting means for raising and lowering the center pipe:
   lowering the center pipe and as a result also the mast by use of the hoisting means prior to installing the mast, the nacelle and the plurality of rotor blades; and
   raising the center pipe by use of the hoisting means after installing the mast, the nacelle and the plurality of rotor blades, and thereby raising the wind turbine.

13. A method of improving stability of a floating foundation for an offshore wind turbine, the method comprising:
   providing the floating foundation, wherein the floating foundation has a weight section, a platform for a wind turbine, and an active heave compensation system, the active heave compensation system comprising at least one wire rope, at least one sensor, at least one actuator, at least one hoisting means, and at least one control device, the active heave compensation system being arranged to alter a position of the weight section relative to the platform for the wind turbine, wherein the at least one hoisting means is connected to the at least one wire rope, and wherein the control device is connected to the at least one sensor for receiving data from the at least one sensor and connected to the at least one hoisting means to communicate a signal to operate the at least one hoisting means to let out or pull in a length of wire rope; and
   altering the position of the weight section by altering the tension of the at least one wire rope connected to the weight section by pulling in or letting out a length of the at least one wire rope by use of the at least one hoisting means, wherein the altering of the position of the weight section is performed automatically as a result of the control device processing data obtained by the at least one sensor and as a response sends a signal to operate the at least one hoisting means.

14. The floating foundation according to claim 7, the buoyancy section comprising an upper section comprising a platform, the platform being an access platform or a working deck.

15. The floating foundation according to claim 7, further comprising:
   a sensor mounted on an above-water portion of the buoyancy section, the sensor configured to obtain information on at least one of: wind speed; wind direction; and air temperature; and
   a control device configured to:
      receive information from the sensor; and
      act on the information by operating equipment in response to the information.

16. The floating foundation according to claim 7, wherein the center pipe extends between the buoyancy section and the weight section, and has an uppermost portion comprising a first end of the center pipe and a lowermost portion comprising a second end of the center pipe,
   wherein the buoyancy section is disposed closer to the first end than to the second end, and the weight section is disposed closer to the second end than to the first end.

17. The floating foundation according to claim 7, wherein the center pipe is open in its lower end portion, so as to allow water into the center pipe.

18. The floating foundation according to claim 7, wherein the floating foundation comprises a selectively releasable locking mechanism for locking the center pipe in a position.

19. The floating foundation according to claim 7, wherein the floating foundation further comprises an active heave compensation system, the active heave compensation system comprising at least one sensor and being arranged to alter a position of the weight section relative to the center pipe in response to information obtained by the at least one sensor, the at least one sensor being arranged to obtain information relevant for the stability of the floating foundation in a body of water.

\* \* \* \* \*